United States Patent
Watanabe (10) Patent No.: US 7,730,993 B2
(45) Date of Patent: Jun. 8, 2010

(54) POWER STEERING DEVICE (75) Inventor: Masaki Watanabe, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 955 days.

(21) Appl. No.: 11/281,624

(22) Filed: Nov. 18, 2005

(65) Prior Publication Data

US 2006/0108172 A1 May 25, 2006

(30) Foreign Application Priority Data

Nov. 22, 2004 (JP) ............................. 2004-336805

(51) Int. Cl.
B62D 5/06 (2006.01)
(52) U.S. Cl. ................... 180/422; 180/417; 180/442
(58) Field of Classification Search ............... 180/417, 180/422, 418, 442
See application file for complete search history.

(56) References Cited

U.S. PATENT DOCUMENTS

| 4,626,994 | A | * | 12/1986 | Yabe et al. | 701/41 |
| 4,834,205 | A | * | 5/1989 | Mizuno et al. | 180/422 |
| 5,762,159 | A | * | 6/1998 | Matsuoka et al. | 180/422 |
| 6,161,069 | A | | 12/2000 | Fujita | |
| 6,250,418 | B1 | * | 6/2001 | Shimizu et al. | 180/422 |
| 6,366,842 | B1 | * | 4/2002 | Kaji et al. | 701/41 |
| 7,226,069 | B2 | * | 6/2007 | Ueda et al. | 180/446 |
| 2003/0000765 | A1 | * | 1/2003 | Spadafora | 180/422 |

FOREIGN PATENT DOCUMENTS

JP 2000-142434 A 5/2000

* cited by examiner

Primary Examiner—Lesley D Morris
Assistant Examiner—Maurice Williams
(74) Attorney, Agent, or Firm—Foley & Lardner LLP (57) ABSTRACT In a power steering device, a hydraulic power cylinder is configured to assist a steering force of a steering mechanism linked to steerable road wheels, a pump is configured to supply a hydraulic pressure to respective pressure chambers of the hydraulic power cylinder, an electric motor is configured to drive the pump, a torque sensor is configured to detect a steering torque of the steering mechanism, an operating load state detecting circuit is configured to detect an operating load state of the pump based on a viscosity resistance characteristic of a working oil, and an electric motor control circuit is configured to output a drive signal to the motor on the basis of a torque signal from the torque sensor and the operating load state of the pump.

21 Claims, 8 Drawing Sheets

POWER STEERING DEVICE

BACKGROUND OF THE INVENTION

The present invention relates to a power steering device that assists a steering operation of a vehicle driver by means of a hydraulic.

A Japanese Patent Application First Publication No. 2000-142434 published on May 23, 2000 exemplifies a previously proposed power steering device. In the disclosed power steering device, a drive current flowing through an electric motor is detected, a temperature rise corresponding to a heat generation quantity of a driver element developed due to this drive current per unit time is determined from its data, accumulates the temperature rise in terms of time to derive a temperature rise value with respect to an oil temperature, and the oil temperature is estimated from this temperature rise value and a temperature of the driver element.

SUMMARY OF THE INVENTION

However, in the previously proposed power steering device, an actual oil temperature is easily affected by an environmental temperature and so forth and, thus, the oil temperature cannot appropriately be estimated.

It is an object of the present invention to provide a power steering device in which an estimation accuracy of the oil temperature can be improved and which enables an appropriate provision of a steering force.

To achieve the above-described object, according to one aspect of the present invention, there is provided with a power steering device comprising: a hydraulic power cylinder configured to assist a steering force of a steering mechanism linked to steerable road wheels; a pump configured to supply a hydraulic pressure to respective pressure chambers of the hydraulic power cylinder; an electric motor configured to drive the pump; a torque sensor configured to detect a steering torque of the steering mechanism; an operating load state detecting circuit configured to detect an operating load state of the pump based on a viscosity resistance characteristic of a working oil; and an electric motor control circuit configured to output a drive signal to the motor on the basis of a torque signal from the torque sensor and the operating load state of the pump.

To achieve the above-described object, according to another aspect of the present invention, there is provided with a power steering device comprising: a hydraulic power cylinder configured to assist a steering force of a steering mechanism linked to steerable road wheels; a pump configured to supply a hydraulic pressure to respective pressure chambers of the hydraulic power cylinder; an electric motor configured to drive the pump; a torque sensor configured to detect a steering torque of the steering mechanism; an operating load state detecting circuit configured to detect an operating load state of the pump; a viscosity resistance characteristic estimating circuit configured to estimate a viscosity resistance characteristic of a working oil on the basis of the operating load state of the pump; and an electric motor control circuit configured to output a drive signal to the electric motor on the basis of a torque signal from the torque sensor and a viscosity resistance characteristic indicative signal from the viscosity resistance characteristic estimation circuit.

To achieve the above-described object, according to a still another aspect of the present invention, there is provided with a power steering device comprising: a hydraulic power cylinder configured to assist a steering force of a steering mechanism linked to steerable road wheels; a pump configured to supply a hydraulic pressure to respective pressure chambers of the hydraulic power cylinder; an electric motor configured to drive the pump; a torque sensor configured to detect a steering torque of the steering mechanism; a revolution state detecting circuit configured to detect a revolution state of the electric motor; a basic controlled variable calculating circuit that calculates a basic controlled variable of the electric motor on the basis of a torque signal from the torque sensor; a correction circuit configured to correct the basic controlled variable on the basis of a viscosity resistance characteristic indicative signal from the viscosity resistance estimation circuit; and an electric motor control circuit configured to output the basic controlled variable corrected by means of the correction circuit as an electric motor control signal to the electric motor.

This summary of the invention does not necessarily describe all necessary features so that the present invention may also be a sub-combination of these described features.

DETAILED DESCRIPTION OF THE INVENTION

Reference will hereinafter be made to the drawings in order to facilitate a better understanding of the present invention.

[System Configuration of a Power Steering System]

Figure 1:
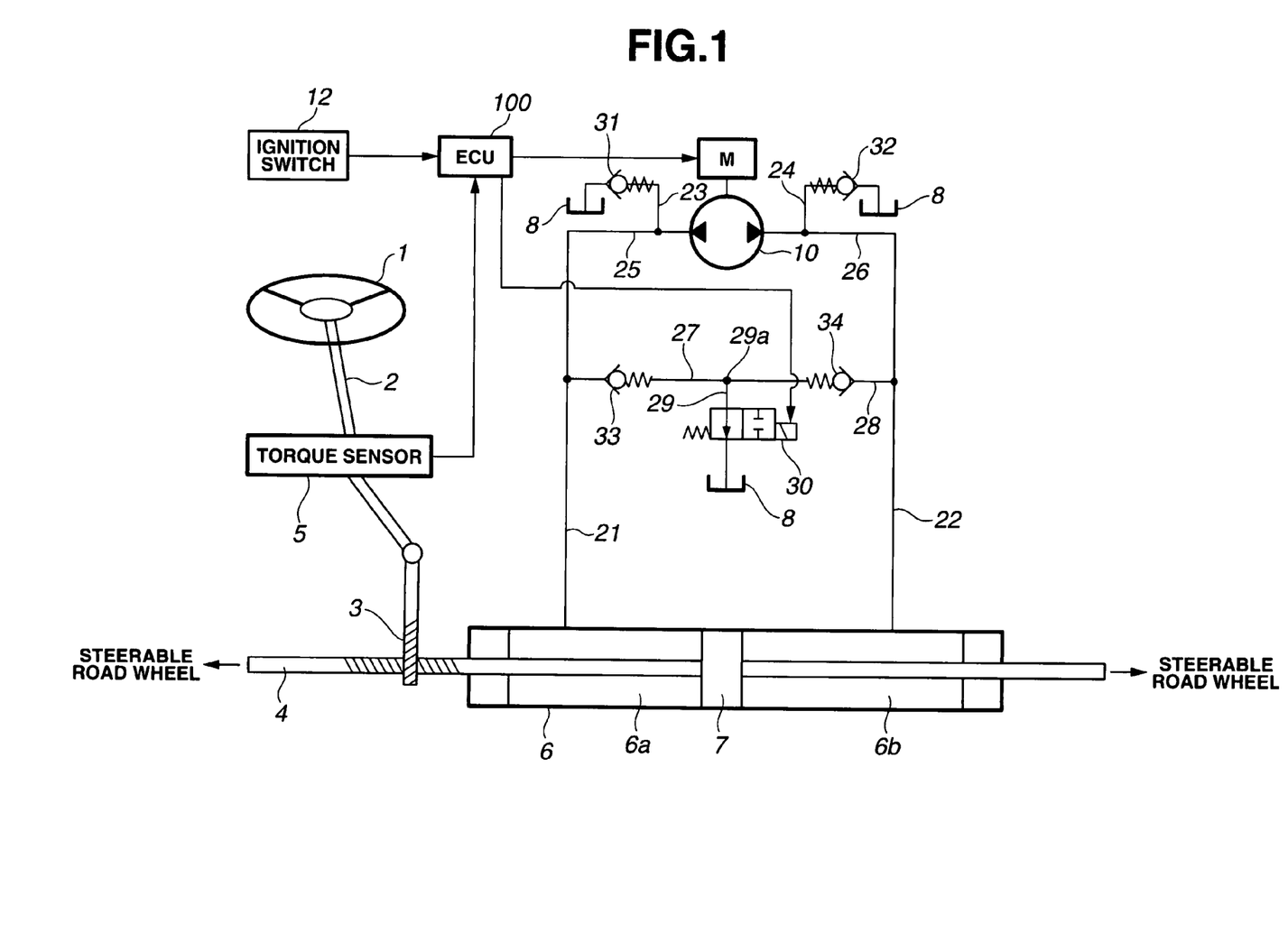
FIG. 1 is a rough system configuration view of a vehicular power steering system to which a preferred embodiment of a power steering device according to the present invention is applicable.

A preferred embodiment of a power steering device according to the present invention will be described with reference to FIGS. 1 through 10. FIG. 1 shows a system configuration view of a vehicular power steering system to which a power steering device according to the present invention is applicable. A steering wheel 1 is connected with a rack axle 4 via a shaft 2 and a pinion 3. A torque sensor 5 (a steering force detecting (circuit) means) to detect a steering torque exerted by a vehicle driver is installed on shaft 2. A torque signal is outputted from torque sensor 5 to control unit 100. A power steering mechanism to assist a movement of rack axle 4 in accordance with the steering torque exerted by the vehicle driver is disposed on rack axle 4. In the power steering mechanism, a reversible pump 10 driven by means of motor M and a hydraulic power cylinder 6 for rack axle 4 to be moved in leftward and rightward directions are installed. A piston 7 which is axially movable is disposed in an internal of this cylinder 6. This piston 7 defines first cylinder chamber 6a and second cylinder chamber 6b in hydraulic power cylinder 6. Each end of rack axle 4 is linked to a steerable road wheel by means of, for example, a tie rod.

First cylinder chamber 6a is connected with a first oil passage 21. First oil passage 21 is connected with a pump 10 via a third oil passage 25. In addition, second cylinder chamber 6b is connected with second oil passage 22. Second oil passage 22 and pump 10 are connected together via a fourth oil passage 26. First and second supply oil passages 23 and 24 are installed on third and fourth oil passages 25 and 26, respectively, and are connected with corresponding reservoir tanks 8.

Suction check valves 31, 32 are installed on first and second supply oil passages 23, 24 to prevent a reverse flow of the working oil to respective reservoir tanks 8. If a quantity of the working oil in first and second oil passages 21, 22 become insufficient, the working oil from reservoir tanks 8 can supplementarily be supplied to these oil passages 21, 22.

In addition, first and second oil passages 21, 22 are connected with first and second communication passages 27, 28, respectively. First and second communication passages 27, 28 are provided with check valves 33, 34 only to allow the flow toward a connection part (or a junction) 29a. Furthermore, connection part 29a is communicated with or interrupted with corresponding reservoir tank 8 via an oil passage 29 connected with a normally open electromagnetic valve 30 according a valve open state or a valve closure state of electromagnetic valve 30. The normally open electromagnetic valve 30 is interrupted at the normal time and is opened when a failure in the steering system occurs to secure a manual steer.

Various kinds of signals from torque sensor 5, from an ignition switch 12, and so forth are inputted to a control unit (ECU) 100. The steering force on the basis of these various kinds of signals is determined by control unit 100. A command (control) signal is outputted from control unit 100 to motor M and to electromagnetic valve 30. An engine revolution speed signal from an engine speed sensor and a vehicle speed signal from a vehicle speed sensor are inputted to control unit 100.

[Control Structure of Control Unit]

Figure 2:
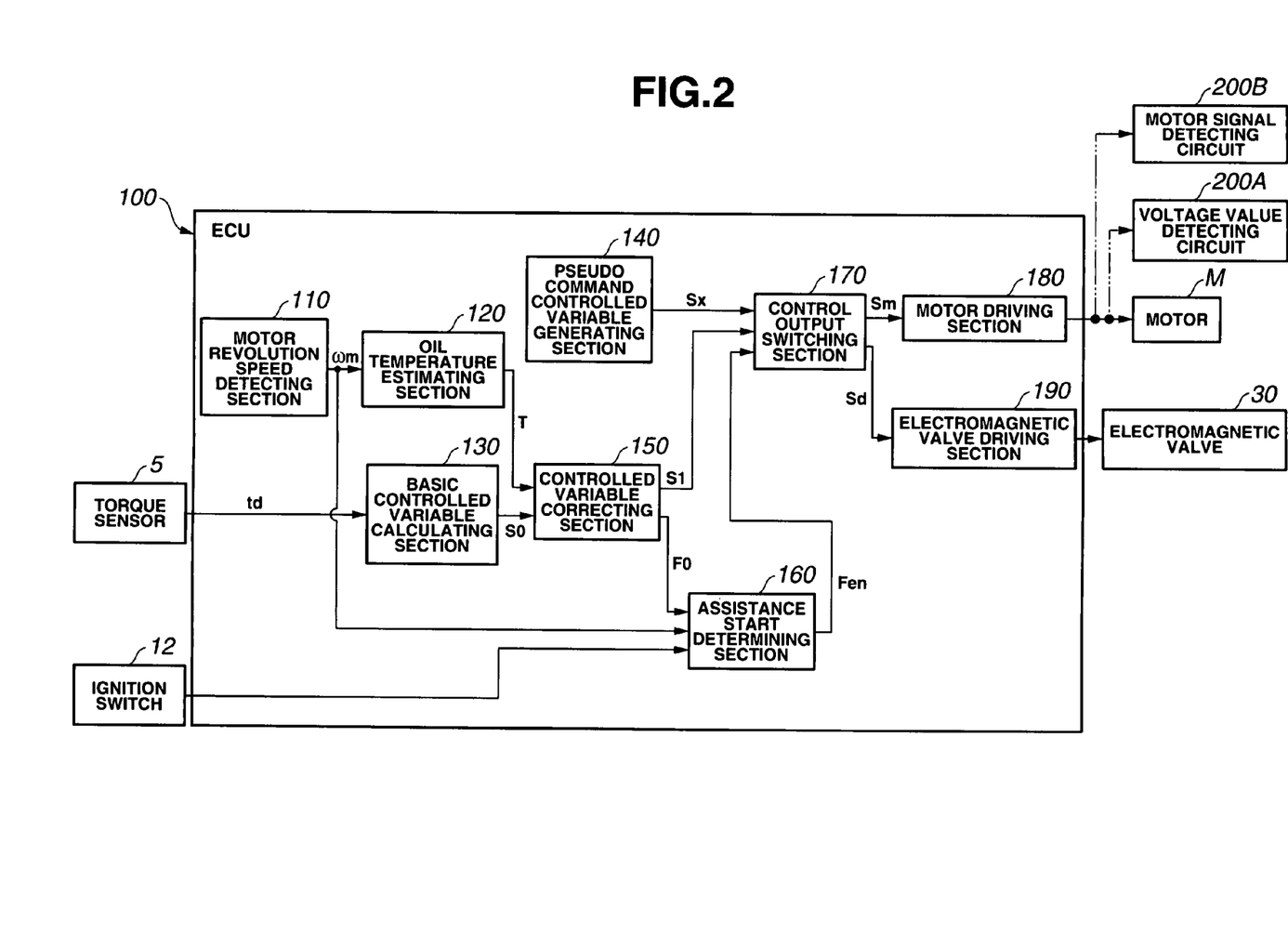
FIG. 2 is a control block diagram of a control unit (ECU) shown in FIG. 1.

FIG. 2 shows a control block diagram of a control unit (ECU) 100. Control unit (ECU) 100 includes a motor revolution speed detecting section 110 (a revolution state detecting circuit (means)), an oil temperature estimating section 120 (an oil temperature estimating circuit (means)), a basic controlled variable calculating section 130, a pseudo command controlled variable generating section 140, a controlled variable correcting section 150, an assistance start determining section 160, a control output switching section 170, a motor driving section 180 (an electric motor controlling (circuit) means), and an electromagnetic valve driving section 190.

Motor revolution speed detecting section 110 inputs a current value flowing into motor M and a voltage value applied across motor M, estimates a number of revolutions per unit time (a revolution speed) ωm of motor M from the current value and the voltage value, and outputs estimated revolution speed ωm to oil temperature estimating section 120 and assistance start determining section 160. A revolution speed sensor can be omitted by estimating revolution speed (or number of revolutions per unit time) of motor M from the current value and the voltage value described above. It is noted that a load on motor M is increased and the revolution speed is decreased as the oil temperature becomes lower and, accordingly, as a viscosity resistance of the working oil becomes higher. On the other hand, as the oil temperature becomes higher and the viscosity resistance becomes lower, the load on motor M becomes smaller and the revolution speed of motor M becomes increased.

It is also noted that, in a case where motor M is a DC brushless motor, a motor revolution quantity can be detected by a position sensor inherently installed in this kind of brushless motor such as a Hall (effect device) sensor. Hence, the motor revolution speed can accurately be detected. The Hall sensor (position sensor) detects a revolution position of an output shaft of the DC brushless motor. In a case of a DC brush motor, the revolution quantity can be estimated from the motor current and motor voltage as in the case of this embodiment described above. In addition, the revolution speed sensor such as an encoder or resolver may be used to directly detect the revolution speed (or quantity) of motor M. The present invention is, specially, not limited to this.

Oil temperature estimating section 120 inputs motor revolution speed ωm from motor revolution speed detecting section 110 and outputs a value of oil temperature T of the working oil on the basis of the value of revolution speed (the number of revolutions per unit time) ωm from an oil temperature-versus-viscosity map preset in control unit 100 to controlled variable correcting section 150.

Basic controlled variable calculating section 130 calculates a basic controlled variable S0 on the basis of the inputted steering torque and outputs calculated basic controlled variable to controlled variable correcting section 150.

Pseudo command controlled variable generating section 140 generates a pseudo command controlled variable Sx of motor M used when the temperature of the working oil (oil temperature) is estimated as will be described later and outputs pseudo command controlled variable Sx to control output switching section 170. It is noted that pseudo command controlled variable Sx is a provision of a constant controlled variable for motor M to detect (or estimate) the number of revolutions ωm (per unit time) of motor M.

Controlled variable correcting section 150 performs a correction of basic controlled variable S0 on the basis of estimated oil temperature T inputted from oil temperature estimating section 120 and outputs corrected controlled variable S1 to control output switching section 170. In addition, after an execution of the correction of basic controlled variable, correction end flag F0 is outputted to assistance start determining section 160.

Assistance start determining section 160 performs a steering assistance start determination by means of the power steering device on the basis of an ignition signal (ignition switch On signal) from ignition switch 12 and outputs an assistance torque output enabling determination flag Fen to control output switching section 170 on the basis of revolution speed (number of revolutions per unit time) ωm and a correction end flag F0 inputted from controlled variable correcting section 150.

Control output switching section 170 switches and outputs either pseudo command controlled variable Sx or corrected basic controlled variable S1 on the basis of a status of assistance torque output enabling determination flag Fen and outputs motor controlled variable Sm and electromagnetic valve controlled variable Sd to motor M and electromagnetic valve 30, respectively.

Motor driving section 180 drives motor M on the basis of motor controlled variable Sm. Electromagnetic valve driving section 190 drives electromagnetic valve 30 on the basis of an electromagnetic valve controlled variable Sd and turns electromagnetic valve 30 in a valve open state when a revolution state of motor M is detected. When electromagnetic valve 30 is in the open state, the working oil within the hydraulic circuit shown in FIG. 1 is in a circulation state. Hence, a load of a viscosity resistance of the working oil applied to cylinder 6 is not reflected on load of motor M. Thus, a pure (or true) viscosity resistance characteristic of the working oil can be detected.

[Estimation of Oil Temperature by Means of a Motor Revolution Speed]

Figure 3:
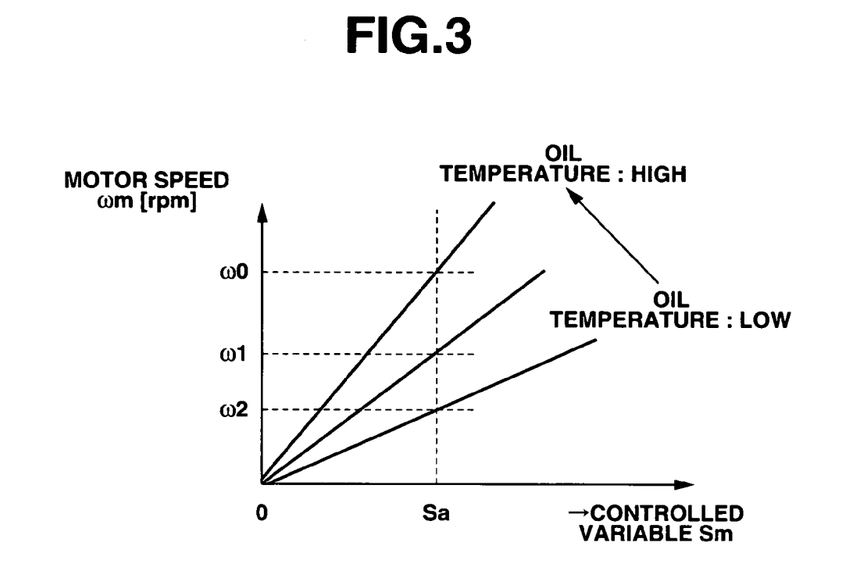
FIG. 3 is a map representing a relationship between a revolution speed characteristic of an electric motor and an oil temperature.

FIG. 3 is a map representing a relationship between a revolution speed characteristic of motor M and oil temperature. Oil temperature estimating section 120 shown in the control block diagram of FIG. 2 estimates oil temperature T in accordance with this map shown in FIG. 3. As the revolution speed of motor M becomes higher, a revolution load of motor M is indicated to be low. That is to say, as the revolution number per unit time (revolution speed) of motor M becomes higher as $\omega 2 \rightarrow \omega 1 \rightarrow \omega 0$, it can be determined that the viscosity (resistance) of the working oil becomes lower and, namely, oil temperature T becomes higher, at the same controlled variable Sa.

[Controlled Variable Calculation]

Figure 4:
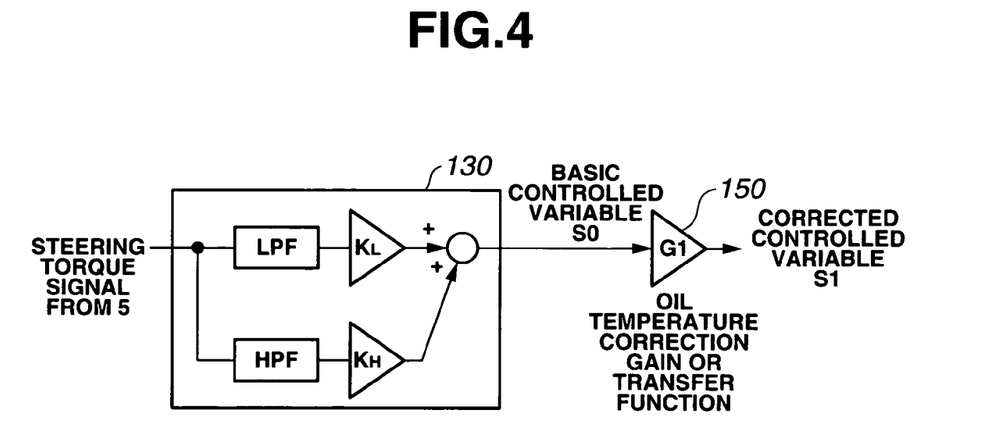
FIG. 4 is a system configuration view representing the calculation of the basic controlled variable and the oil temperature.

FIG. 4 shows a system configuration view representing calculations of basic controlled variable S0 and corrected controlled variable S1. In basic controlled variable calculating section 130 and controlled variable correcting section 150 shown in the block diagram of FIG. 2, basic controlled variable S0 and corrected controlled variable S1 of motor M and electromagnetic valve 30 are calculated from the steering torque detected by means of torque sensor 5.

Basic controlled variable calculating section 130 is provided with a low pass filter LPF and a high pass filter HPF. Gains $K_L$, $K_H$ are multiplied with the inputted steering torque and summed at an adder to derive basic controlled variable S0.

Controlled variable correcting section 150 sets an oil temperature correction gain G1 on the basis of estimated oil temperature T and multiplies oil temperature correction gain G1 with basic controlled variable S0 to derive corrected controlled variable S1. A preset oil temperature-versus-correction-coefficient map (refer to FIG. 5) may be used for the setting of oil temperature correction gain G1 or, alternatively, G1 may be a transfer function (refer to FIG. 6). The present invention is not limited to this.

[Correction Coefficient Setting]

Figure 5:
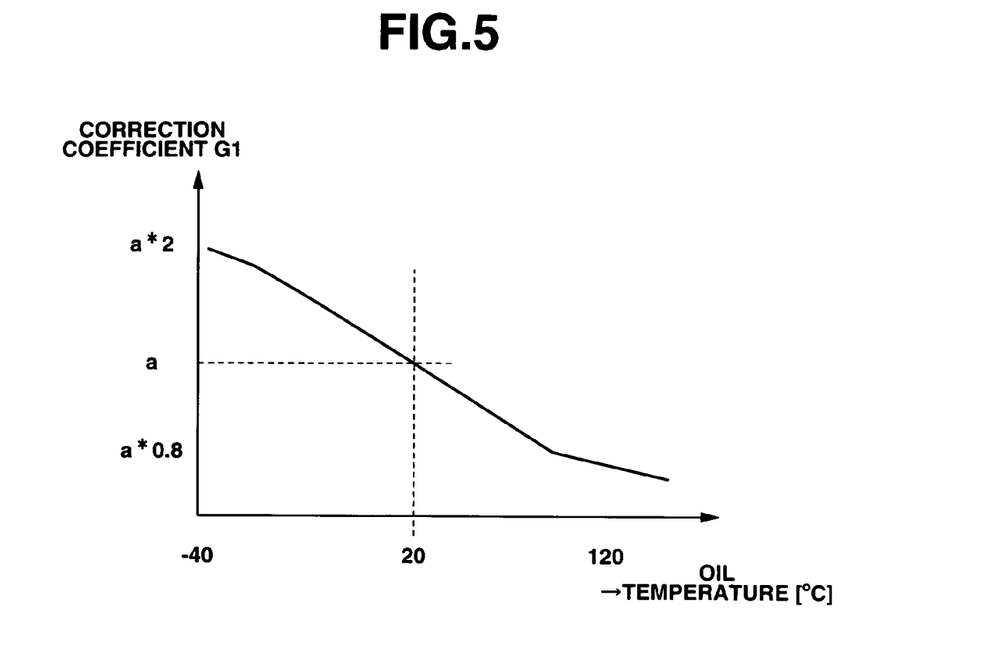
FIG. 5 is a map representing a relationship between an oil temperature and a correction coefficient.

FIG. 5 shows a map representing a relationship between the oil temperature and oil temperature correction coefficient G1. As the oil temperature becomes higher, correction coefficient G1 is raised and is set so as to compensate for a load of motor M due to a friction loss along with a viscosity increase of the working oil during the low temperature.

Figure 6:
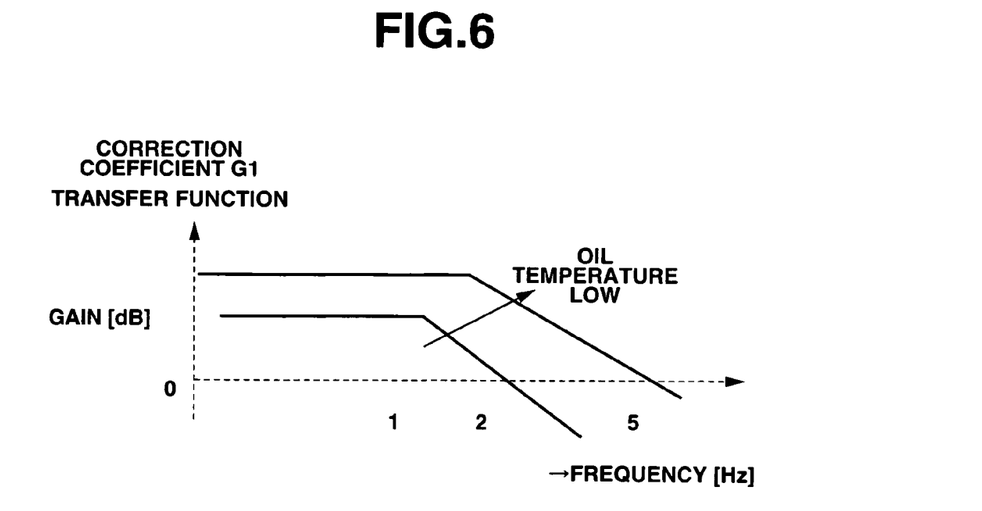
FIG. 6 is a characteristic graph representing a characteristic of a transfer function with respect to the oil temperature.

FIG. 6 shows a characteristic graph representing a characteristic of transfer function G1 described above with respect to the oil temperature. In this characteristic graph shown in FIG. 6, in addition to correction gain G1, a cut-off frequency thereof is varied in accordance with the oil temperature. Along with the lower temperature of the oil temperature, the cut-off frequency is modified in accordance with the oil temperature. A transfer of the cut-off frequency toward a higher frequency side as the oil temperature becomes lower permits a favorable steering feeling to be achieved under the low oil temperature.

It is noted that, according to an individual (body characteristic) difference of motor M and pump 10, the load of motor M is different during a normal (positive) revolution of motor M and during a reverse (negative) revolution thereof. Hence, in a case where the same controlled variable in the normal and reverse revolution directions is outputted to motor M, a steering assistance quantity in a revolution direction in which load of motor M is large tends to become insufficient. Thus, there is a possibility that a steering feeling during a rightward assistance steering direction and during a leftward assistance steering direction is made different.

Hence, motor revolution speed detecting section 110 detects the revolution states in both of the normal and reverse revolution directions of motor M. Controlled variable correcting section 150 calculates correction controlled variable S1 (corrected controlled variable S1) on the basis of this normal and reverse revolution characteristics. In this way, the load of motor M based on the individual (body characteristic) difference of motor M and pump 10 is detected and basic controlled variable S) is corrected to provide corrected controlled variable S1. Thus, the steering feelings during the rightward and leftward steering directions are made coincident with each other.

[Steering Assistance Control Procedure]

Figure 7:
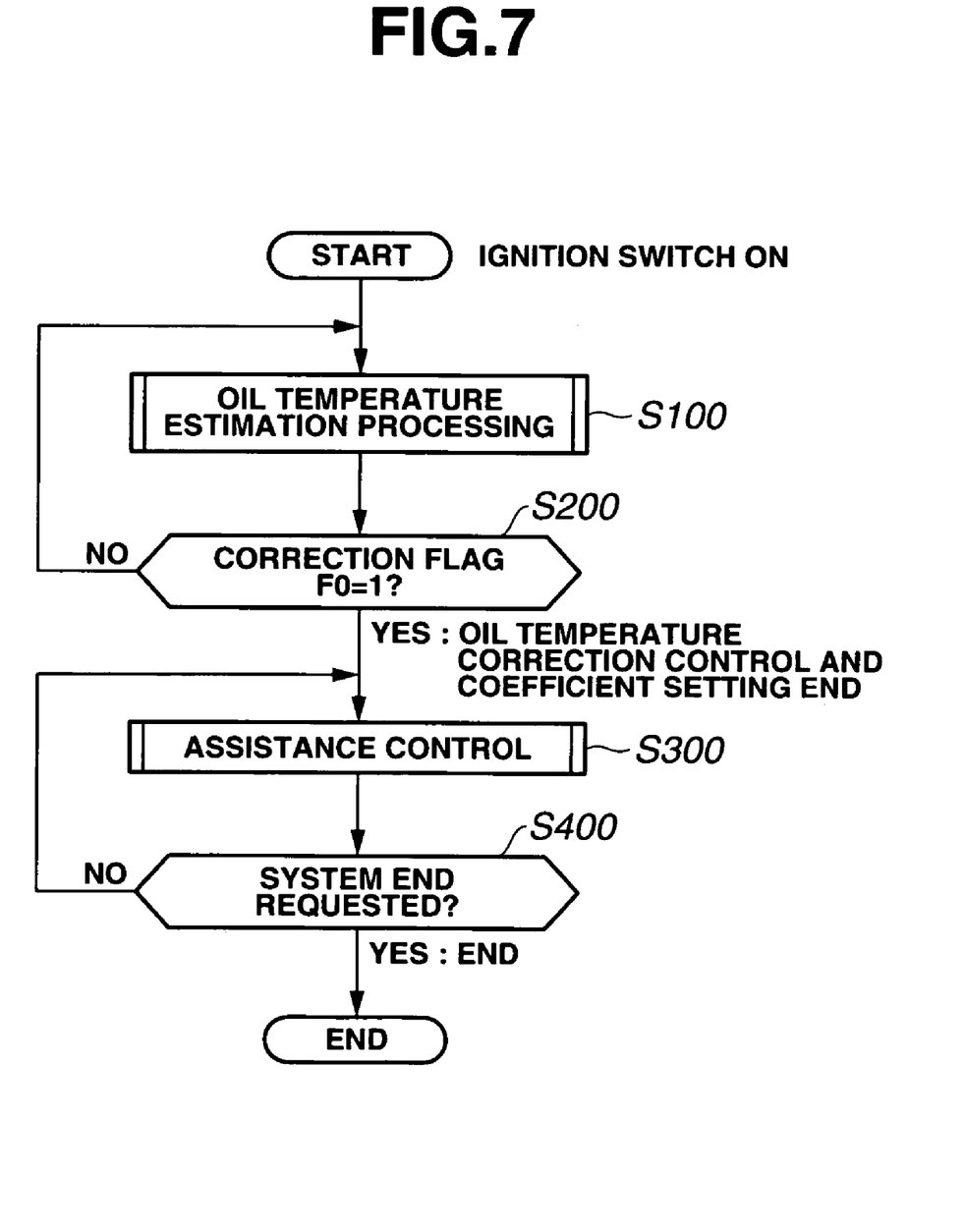
FIG. 7 is a flowchart representing a main flow of a steering assistance control procedure.

FIG. 7 shows a flowchart representing a flow of a steering assistance control procedure. Hereinafter, control contents of each step will be explained below.

(Main Flow)

When ignition switch 12 is turned on, the procedure shown in FIG. 7 is started. At a step S100, an oil temperature estimation processing as will be described later is executed and the routine goes to a step S200.

At step S200, control unit 100 determines whether correction flag F0 is set to "1". If Yes at step S200, the routine goes to a step S300. If No at step S200, the routine returns to step S100 since correction flag F0 is not set.

At step S300, an (power) assistance control is executed and the routine goes to a step S400.

At step S400, control unit 100 determines whether a system end (finish) of the (power) assistance control is requested. If Yes at step S400, the control is ended. If No at step S400, the routine is returned to step S300.

(Oil Temperature Estimation Control Processing)

Figure 8:
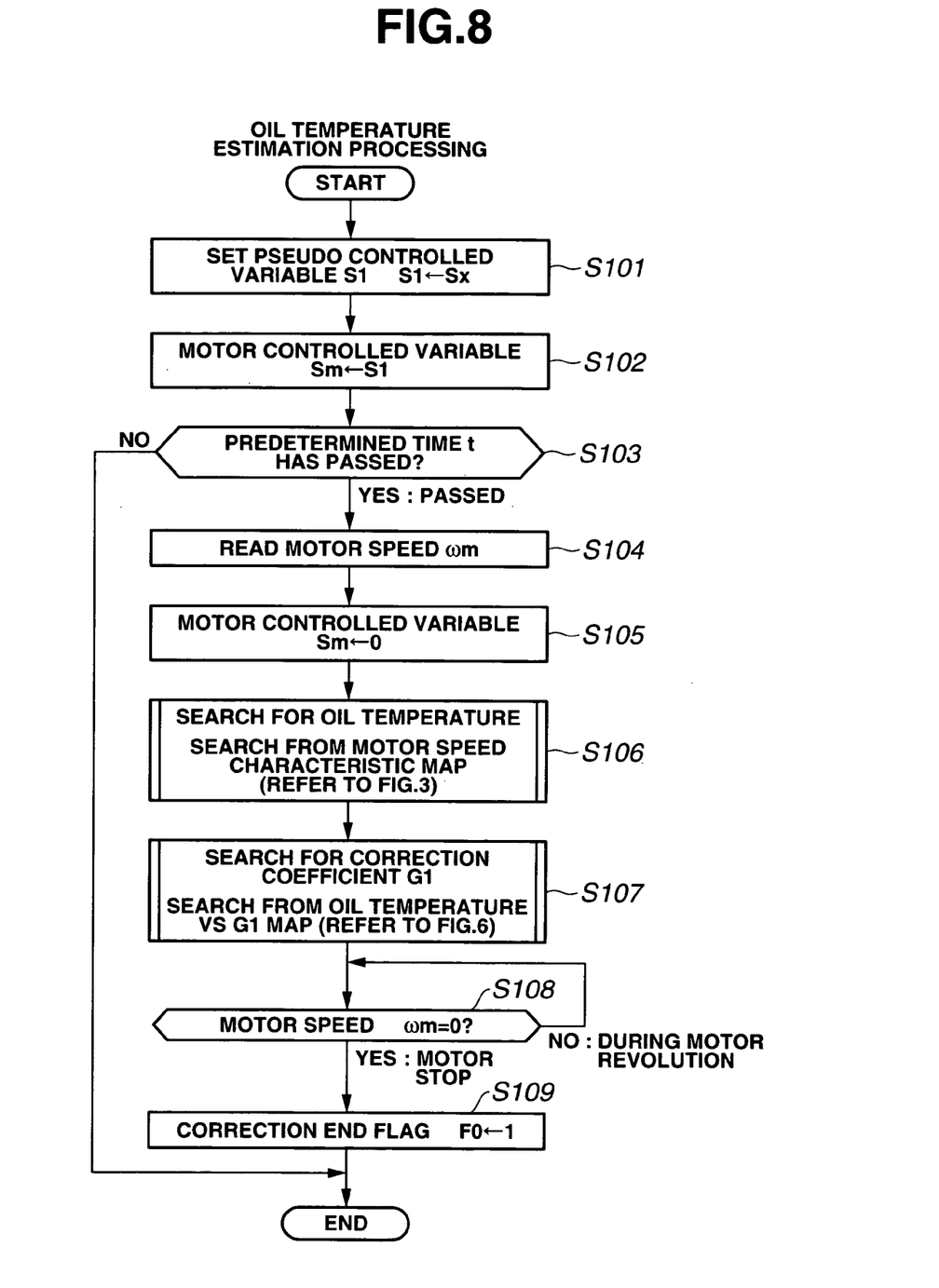
FIG. 8 is a flowchart representing a flow of an oil temperature estimation procedure in the flowchart of FIG. 7.

FIG. 8 shows a detailed flowchart representing the flow of the oil temperature estimation control processing at step S100 shown in FIG. 7. First, at a step S101, control unit 101 outputs pseudo command controlled variable Sx and sets motor corrected controlled variable S1 to pseudo command controlled variable Sx and the routine goes to a step S102.

At step S102, control unit 100 sets motor controlled variable Sm to corrected controlled variable S1. That is to say, motor controlled variable Sm=pseudo command controlled variable Sx (Sm←Sx) and the routine goes to a step S103.

At step S103, control unit 100 determines whether a predetermined time t has passed from a time at which motor controlled variable Sm is outputted to motor M. Predetermined time t is a time duration from a time point t1 in a time chart of FIG. 10 to a time point t2 shown in FIG. 10, viz., t=t2–t1. If predetermined time t has passed, the routine goes to a step S104. If predetermined time T has not yet passed (No), the oil temperature estimation control processing (procedure) is ended and the routine jumps to step S200 in FIG. 7.

At step S104, control unit 100 retrieves (reads) motor revolution speed ωm and the routine goes to a step S105.

At step S105, control unit 100 sets controlled variable Sm of motor M to 0 in order to make the motor revolution stop and the routine goes to a step S106.

At step S106, control unit 100 estimates the oil temperature from oil temperature—versus—revolution speed map shown in FIG. 3 and the routine goes to a step S107. The motor controlled variable Sm is taken along a lateral axis of FIG. 3 and number of revolutions per unit time (motor revolution speed) ωm is taken along a longitudinal axis of FIG. 3 with the oil temperature a parameter for each characteristic line.

At step S107, control unit 100 determines oil temperature correction coefficient (or gain) G1 from either the oil temperature—versus—correction coefficient map shown in FIG. 5 or the transfer function (transfer characteristic) map of gain G1 shown in FIG. 6 and the routine goes to a step S108.

At step S108, control unit 100 determines whether revolution speed tom of motor M is zero or not. If Yes at step S108, the routine goes to a step S109. If No at step S108, the routine goes to step S108 shown in FIG. 8.

At step S109, control unit 100 sets correction end flag F0 to "1", the oil temperature estimation processing is ended, and the routine goes to step S200 in FIG. 7.

[Steering Assistance Control Processing]

Figure 9:
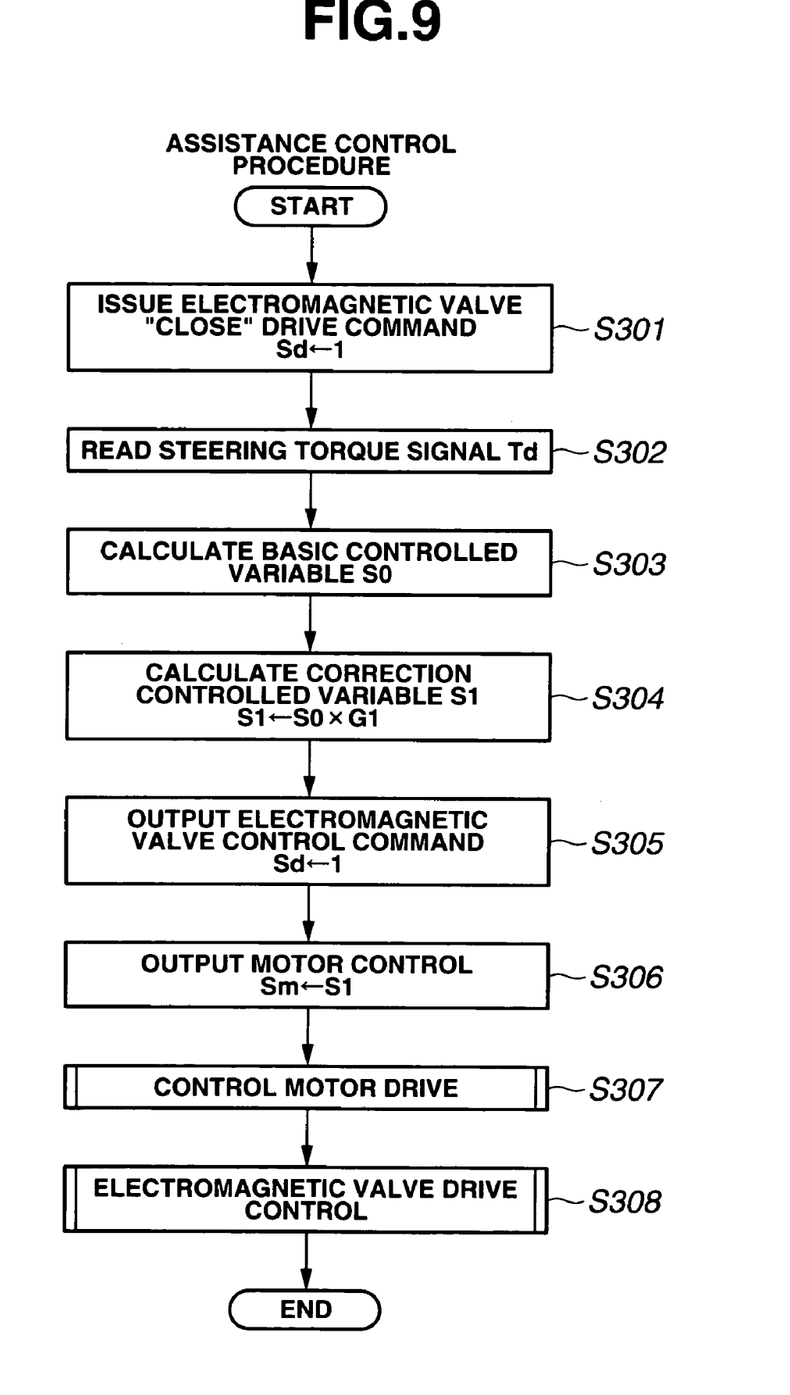
FIG. 9 is a flowchart representing a flow of a steering assistance control procedure in the flowchart of FIG. 7.

FIG. 9 shows a flowchart representing a flow of the (steering) assistance control procedure at step S300 in FIG. 7. At step S301, electromagnetic valve controlled variable Sd is a valve closure command and the routine goes to a step S302.

At a step S302, a steering torque signal Td is read and the routine goes to a step S303.

At step S303, control unit 100 calculates basic controlled variable S0 on the basis of steering torque Td and the routine goes to a step S304.

At step S304, control unit 100 reads correction coefficient (gain) G1 based on the oil temperature and calculates corrected controlled variable S1 which is a multiplication of the basic controlled variable S0 by correction coefficient (gain) G1 and the routine goes to a step S305.

At step S305, control unit 100 outputs electromagnetic valve controlled variable Sd to close normally open electromagnetic valve 30 and the routine goes to a step S306.

At step S306, control unit 100 outputs motor controlled variable Sm based on corrected controlled variable S1 and the routine goes to a step S307.

At step S307, control unit 100 performs the drive control of motor M and the routine goes to a step S308.

At step S308, control unit 100 performs the drive control of electromagnetic valve 30 and the routine goes to step S400 in FIG. 7.

[Aging Variation in Controlled Variable Setting Control According to the Oil Temperature]

Figure 10:
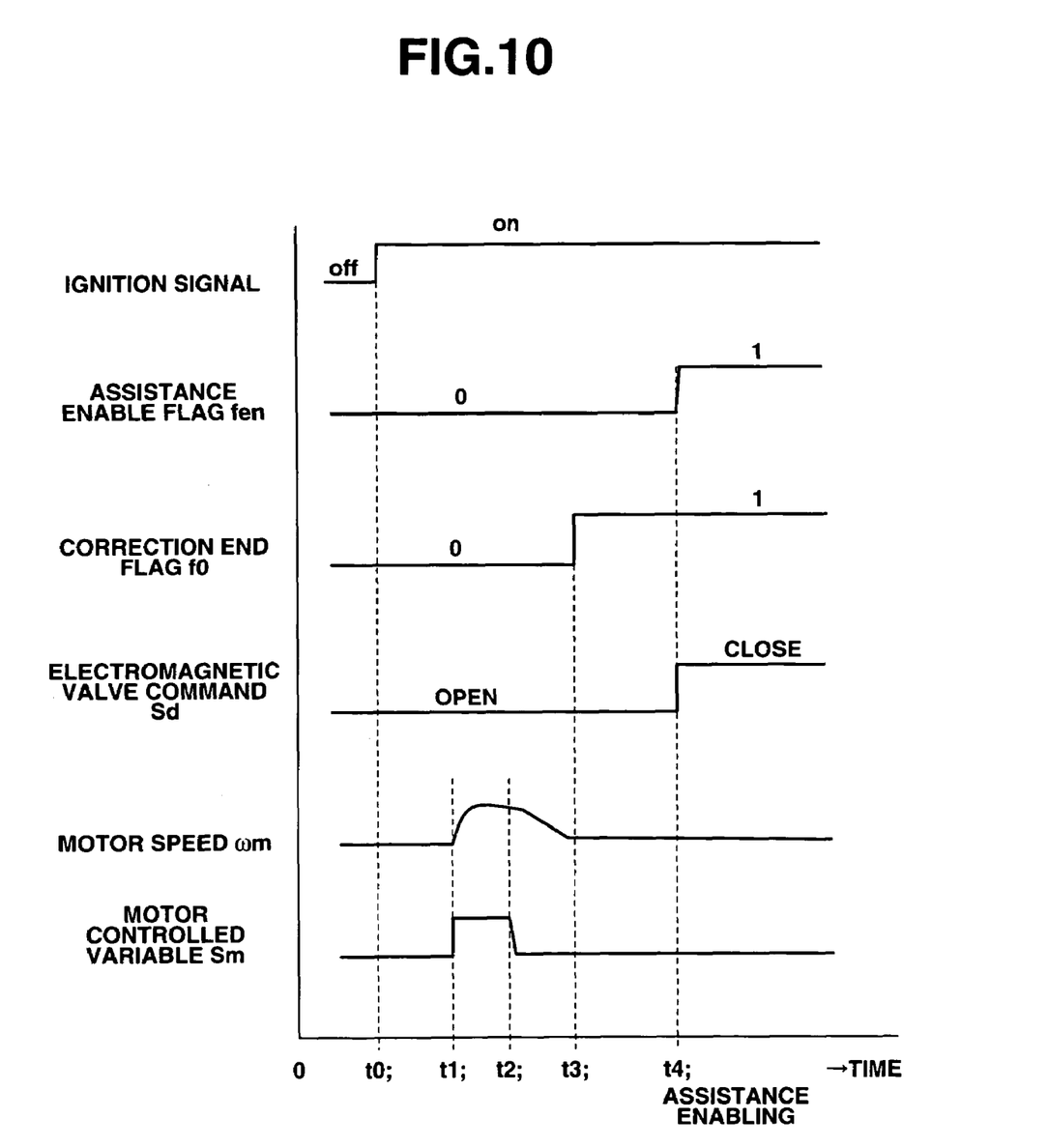
FIG. 10 is a timing chart representing a controlled variable setting control according to the oil temperature.

FIG. 10 shows the timing chart of the controlled variable setting control according to the oil temperature.

(Time Point t0)

At a time point of t0, ignition switch 12 is turned ON (the ignition signal is turned to an on state) and a system is activated.

(Time Point t1)

At a time point of t1, the controlled variable of motor M is set to pseudo command controlled variable Sx for the oil temperature estimation processing and revolution speed (the number of revolutions per unit time) ωm of motor M starts to rise.

(Time Point t2)

At a time point t2, control unit 100 detects the number of revolutions of motor M from time point to and calculates number of revolutions per unit time (motor speed) ωm of motor M. On the basis of revolution speed ωm, the oil temperature is specified from the map shown in FIG. 3 and basic controlled variable S0 is set. In addition, correction coefficient G1 is identified from the map shown in FIG. 5 and corrected controlled variable S1 is set. Thereafter, the control of motor M at pseudo command controlled variable Sx is stopped.

(Time Point t3)

At a time point t3, a pseudo drive of motor M for the oil temperature drive is ended and the correction control is ended. Thus, correction control end flag F0 is outputted.

(Time Point t4)

At a time point of t4, control unit 100 confirms the (revolution) stop of motor M and correction control end flag F0 and outputs assistance start enabling (allowance) flag F1. Along with this, an ordinary steering power assistance control is started, controlled variable Sd is outputted to normally open electromagnetic valve 30, and electromagnetic valve 30 is in the valve closure state. In addition, basic controlled variable S0 in accordance with the steering torque is calculated. Corrected controlled variable S1 for which the correction according to the oil temperature is carried out is outputted to motor M as motor controlled variable Sm.

[Comparison in Action and Advantage Between the Previously Proposed Power Steering Device and the Preferred Embodiment of the Power Steering Device According to the Present Invention]

In the previously proposed power steering device described in the BACKGROUND OF THE INVENTION, the oil temperature is estimated from the temperature rise value of the driver element corresponding to the quantity of heat generation per unit time of the driver element and the temperature of the driver element. However, in the previously proposed power steering device, the actual oil temperature is easy to be influenced from the environmental temperature. The oil temperature cannot appropriately be estimated.

On the other hand, in the power steering device as in the embodiment, motor revolution speed detecting section 110 to estimate number of revolutions per unit time (revolution speed) of motor M, oil temperature estimating section 120 to estimate the value of oil temperature T of the working oil based on the value of ωm from oil temperature-versus-viscosity resistance characteristic (revolution speed) map, and a motor driving section 180 to perform the control over motor M and over electromagnetic valve 30 on the basis of oil temperature T are installed.

Thus, if the oil temperature becomes lower, the viscosity is raised, an operating load of pump 10 becomes larger, the revolution load of motor M becomes accordingly larger, and number of revolutions per unit time ωm of motor M with respect to the same controlled variable Sa is decreased. If the oil temperature becomes higher, the viscosity (resistance) becomes decreased and the revolution load of motor, viz., the operating load of pump 10 becomes smaller but number of revolutions per unit time ωm with respect to the same controlled variable Sa becomes larger (raised). By detecting a variation of number of revolutions per unit time ωm, an oil temperature estimation accuracy can be improved as compared with the previously proposed steering device that detects the temperature rise of the driver element. Hence, by appropriately changing controlled variable S1 with respect to motor M in accordance with the viscosity of the working oil, an appropriate steering force can be obtained.

Other Embodiments

The power steering device in the embodiment has been explained with reference to FIGS. 1 to 10. A specific structure of the steering device according to the present invention is not limited to the embodiment described above. Various changes and modifications may be made without departing from the scope and sprit of the present invention.

In the embodiment described above, motor revolution speed detecting section 110 inputs the current value and the voltage value on motor M, estimates number of revolutions per unit time (revolution speed) ωm from the current value and the voltage value and oil temperature estimating section 120 estimates the oil temperature which is a parameter of the viscosity of the working oil which provides the revolution load on motor M according to the variation of number of revolutions per unit time ωm. In a case where motor M is driven through a PWM (Pulse Width Modulation) control, the voltage value in a constant PMW drive is detected so that the revolution load of motor M may directly be detected. In a case where the revolution load of motor M in the PWM drive is varied, a counter electromotive force applied across motor M is similarly varied and reflected on the voltage value. Thus, the revolution load can easily be detected and the oil temperature can accurately be estimated.

It is noted that, according to the present invention, an operating load state detecting circuit configured to detect an operating load of pump 10 based on the viscosity resistance characteristic of the working oil includes the revolution state detecting circuit which corresponds to motor revolution speed detecting section. The revolution state detecting circuit detects the revolution state of the electric motor by detecting the number of revolutions per unit time when the constant current (the constant controlled variable) is caused to flow in motor M. Since, when the oil temperature is low and the viscosity resistance of the working oil is accordingly large, the load applied to electric motor M (viz., the operating load of pump 10) is large. Therefore, the number of revolutions per unit time becomes small. On the contrary, if the oil temperature is high (the viscosity resistance is low), the number of revolutions becomes large (increased). By detecting the difference in the revolution speed, the oil temperature can easily be detected. In addition, revolution state detecting circuit (means) detects the current value flowing into the electric motor and the voltage value applied to the electric motor and estimates the revolution speed of the electric motor from these current value and the voltage value. Hence, the revolution speed sensor of motor M is, particularly, not needed to be installed.

It is also noted that, the revolution state detecting circuit (means) detects the revolution load of the electric motor. When the oil temperature is low and the viscosity resistance of the working oil is large, the load applied to the electric motor becomes large. On the contrary, when the oil temperature is high, the load becomes small. By detecting this load, the oil temperature can easily be estimated.

It is also noted that the revolution state detecting circuit (means) detects the voltage applied across the electric motor when a constant current is caused to flow through the electric motor. The revolution load of the electric motor is detected on the basis of this detected voltage. In a case where the load applied to the electric motor, the counter electromagnetic force applied across the electric motor is similarly varied. Since this variation is reflected on the voltage value, this voltage value is detected so that the load of the electric motor can be detected.

It is also noted that the power steering device includes: first and second oil passages 21, 22 through which the hydraulic pressure is supplied to the respective pressure chambers 6a, 6b of hydraulic power cylinder 6; the communication passage (27, 28) to communicate between first and second oil passages; switching valve 30 which switches the communication of this communication passage and interruption of this communication passage; and the switching valve control circuit (means) configured to output the control signal to the switching valve. The switching valve control circuit (means) causes the switching valve to be in the valve open state when the revolution state of the electric motor is detected. By causing the switching valve to be in the valve open state, the working oil in the hydraulic circuit is in the circulation state. Thus, the pure (true) viscosity resistance characteristic of the working oil can be detected. (The load applied to the power cylinder is not reflected on the load of the motor).

The revolution state detecting circuit (means) detects the revolution states of the electric motor in both of the normal and reverse directions and corrects the control (drive) signal to the electric motor on the basis of these normal and reverse direction revolution characteristics. The loads of the electric motor during the normal direction revolution and during the reverse direction revolution are different from each other according to the individual body differences of the electric motor and the reversible pump. That is to say, in a case where the drive signal is similarly outputted with respect to the normal and reverse directions, the steering assistance quantity in which one of the loads of the electric motor which is larger than the other tends to become insufficient. There is a possibility that the steering feelings are different during the rightward assistance steering and during the leftward assistance steering. Thus, by detecting and correcting the load of the electric motor based on the individual body difference such as the motor, the steering feelings during the leftward and rightward steering operations can be made coincident with each other.

It is also noted that, in the power steering device according to the present invention, a voltage value detecting circuit 200A may be configured to detect the voltage value applied across electric motor M and the operating load of pump 10 is estimated from the detected voltage value of voltage value detecting circuit 200A. It is, furthermore, noted that an electric motor signal detecting circuit 200B may be configured to detect an input signal to electric motor M or to detect an output signal from motor M so that the operating load of pump 10 is estimated from the input signal to motor M or the output signal from motor M. It is, furthermore, noted that a viscosity resistance estimating circuit configured to estimate a viscosity resistance characteristic of the working oil on the basis of the operating load state of pump 10, viz., the revolution state of motor M corresponds to oil temperature estimating section 120. It is finally noted that a correction circuit corresponds to basic controlled variable correcting section 150. In this embodiment, each section in the ECU 100 is software, but each section could be an electric circuitry. In addition, the input signal to the electric motor M could be PWM signal, current signal or voltage signal, and the output signal could be current signal or voltage signal.

This application is based on a prior Japanese Patent Application No. 2004-336805 filed in Japan on Nov. 22, 2004, the disclosures of which are hereby incorporated by reference.

What is claimed is:

1. A power steering device comprising:
   a hydraulic power cylinder configured to assist a steering force of a steering mechanism linked to steerable road wheels;
   a pump configured to supply a hydraulic pressure to respective pressure chambers of the hydraulic power cylinder; an electric motor configured to drive the pump;
   a torque sensor configured to detect a steering torque of the steering mechanism;
   an operating load state detecting circuit configured to detect an operating load state of the pump based on a viscosity resistance characteristic of a working oil; and
   an electric motor control circuit configured to output a drive signal to the motor on the basis of a torque signal from the torque sensor and the operating load state of the pump, wherein the operating load state detecting circuit detects the operating load state of the pump on a basis of an actual number of revolutions per unit time of the electric motor, wherein the operating load state detecting circuit comprises a revolution state detecting circuit configured to detect a revolution state of the electric motor and the operating load of the pump is estimated on the basis of the revolution state of the electric motor, and wherein the revolution state detecting circuit detects the revolution state of the electric motor by detecting a number of revolutions per unit time of the electric motor when a constant voltage is caused to flow into the electric motor, and wherein the operating load state detecting circuit estimates a temperature of the working oil on the basis of the revolution state of the electric motor and the electric motor control circuit outputs the drive signal to the electric motor on the basis of the temperature of the working oil and the steering torque.

2. A power steering device as claimed in claim 1, wherein the revolution state detecting circuit detects a current value flowing into the electric motor and a voltage value across the electric motor and estimates the number of revolutions per unit time of the electric motor from the current value and the voltage value.

3. A power steering device as claimed in claim 1, wherein the electric motor is a brushless motor in which a position sensor configured to detect a revolution position of an output axle of the brushless motor is equipped and the revolution state detecting circuit determines the revolution state of the electric motor on the basis of a position sensor output signal.

4. A power steering device as claimed in claim 1, wherein the revolution state detecting circuit determines the revolution state of the electric motor on the basis of a revolution load of the electric motor.

5. A power steering device as claimed in claim 4, wherein the electric motor control circuit performs a PWM drive control for the electric motor and the revolution state detecting circuit determines the revolution state of the electric motor on the basis of the voltage value in the PWM drive control.

6. A power steering device as claimed in claim 1, wherein the revolution state detecting circuit detects revolution states of the electric motor in a normal direction and in a reverse direction and corrects the drive signal of the electric motor on the basis of a revolution characteristic in the normal direction of the electric motor and the revolution characteristic in the reverse direction of the electric motor.

7. A power steering device as claimed in claim 1, wherein the electric motor is a brushless motor in which a position sensor to detect a revolution position of an output axle of the electric motor is equipped and the revolution state detecting circuit determines the revolution state of the electric motor on the basis of a position sensor output signal.

8. A power steering device as claimed in claim 1, wherein the electric motor control circuit adjusts a correction gain of the drive signal on the basis of the temperature of the working oil.

9. A power steering device as claimed in claim 1, wherein the electric motor control circuit adjusts a transfer characteristic of the drive signal on the basis of the temperature of the working oil.

10. A power steering device as claimed in claim 1, wherein the power steering device further comprises a voltage value detecting circuit configured to detect a voltage value applied across the electric motor and the operating load of the pump is estimated on the basis of the voltage value.

11. A power steering device as claimed in claim 10, wherein the electric motor control circuit outputs the drive signal to the electric motor on the basis of the voltage value applied across the electric motor when a constant current is caused to flow in the electric motor and the steering torque.

12. A power steering device as claimed in claim 10, wherein the operating load state detecting circuit estimates a temperature of the working oil on the basis of the voltage value and the electric motor control circuit outputs the drive signal to the electric motor on the basis of the temperature of the working oil and the steering torque.

13. A power steering device as claimed in claim 1, wherein the power steering device further comprises an electric motor signal detecting circuit configured to detect an input signal to the electric motor or an output signal from the electric motor and the operating load of the pump is estimated on the basis of either the input signal or the output signal.

14. A power steering device as claimed in claim 13, wherein the electric motor control circuit outputs the drive signal to the electric motor on the basis of a voltage value applied across the electric motor when a constant current is caused to flow in the electric motor and the steering torque.

15. A power steering device as claimed in claim 13, wherein the electric motor control circuit performs a PWM drive control for the electric motor and the revolution state of the electric motor is determined on the basis of a voltage value in the PWM drive control.

16. A power steering device comprising:
a hydraulic power cylinder configured to assist a steering force of a steering mechanism linked to steerable road wheels;
a pump configured to supply a hydraulic pressure to respective pressure chambers of the hydraulic power cylinder;
an electric motor configured to drive the pump;
a torque sensor configured to detect a steering torque of the steering mechanism;
an operating load state detecting circuit configured to detect an operating load state of the pump based on a viscosity resistance characteristic of a working oil; and
an electric motor control circuit configured to output a drive signal to the motor on the basis of a torque signal from the torque sensor and the operating load state of the pump, wherein the operating load state detecting circuit comprises a revolution state detecting circuit configured to detect a revolution state of the electric motor and the operating load of the pump is estimated on the basis of the revolution state of the electric motor and wherein the power steering device further comprises: first and second passages through which the hydraulic pressure is supplied to the respective pressure chambers of the hydraulic power cylinder; a communication passage communicating between the first passage and the second passage; and a switching valve configured to switch between a communication of the communication passage and an interruption thereof; and a switching valve control circuit configured to output a control signal to the switching valve, wherein the switching valve is turned in a valve open state when the revolution state of the electric motor is detected by the revolution state detecting circuit.

17. A power steering device comprising:
a hydraulic power cylinder configured to assist a steering force of a steering mechanism linked to steerable road wheels;

a pump configured to supply a hydraulic pressure to respective pressure chambers of the hydraulic power cylinder;

an electric motor configured to drive the pump;

a torque sensor configured to detect a steering torque of the steering mechanism;

an operating load state detecting circuit configured to detect an operating load state of the pump based on a viscosity resistance characteristic of a working oil; and an electric motor control circuit configured to output a drive signal to the motor on the basis of a torque signal from the torque sensor and the operating load state of the pump, wherein the power steering device further comprises a voltage value detecting circuit configured to detect a voltage value applied across the electric motor and the operating load of the pump is estimated on the basis of the voltage value and wherein the power steering device further comprises: first and second passages through which the hydraulic pressure is supplied to the respective pressure chambers of the hydraulic power cylinder; a communication passage to communicate between the first passage and the second passage; a switching valve configured to switch between a communication of the communication passage and an interruption thereof, and a switching valve control circuit configured to output a control signal to the switching valve and wherein the switching valve control circuit outputs the control signal to the switching valve to turn a valve open state when the revolution state of the electric motor is detected.

18. A power steering device comprising:

a hydraulic power cylinder configured to assist a steering force of a steering mechanism linked to steerable road wheels;

a pump configured to supply a hydraulic pressure to respective pressure chambers of the hydraulic power cylinder;

an electric motor configured to drive the pump;

a torque sensor configured to detect a steering torque of the steering mechanism;

an operating load state detecting circuit configured to detect an operating load state of the pump;

a viscosity resistance characteristic estimation circuit configured to estimate a viscosity resistance characteristic of a working oil on the basis of the operating load state of the pump based on an actual number of revolutions per unit time of the electric motor; and an electric motor control circuit configured to output a drive signal to the electric motor on the basis of a torque signal from the torque sensor and a viscosity resistance characteristic indicative signal from the viscosity resistance characteristic estimation circuit, wherein the power steering device further comprises a voltage value detecting circuit configured to detect a voltage value applied across the electric motor and the operating load of the pump is estimated on the basis of the voltage value.

19. A power steering device as claimed in claim 18, wherein the operating load state detecting circuit comprises a revolution state detecting circuit configured to detect a revolution state of the electric motor and the operating load state of the pump is estimated on the basis of the revolution state of the electric motor.

20. A power steering device as claimed in claim 18, wherein the power steering device further comprises a motor signal detecting circuit configured to detect an input signal to the electric motor or an output signal from the electric motor and the operating load of the pump is estimated on the basis of the input signal to the electric motor or the output signal from the electric motor.

21. A power steering device comprising:

a hydraulic power cylinder configured to assist a steering force of a steering mechanism linked to steerable road wheels;

a pump configured to supply a hydraulic pressure to respective pressure chambers of the hydraulic power cylinder;

an electric motor configured to drive the pump;

a torque sensor configured to detect a steering torque of the steering mechanism;

a revolution state detecting circuit configured to detect a revolution state of the electric motor;

a viscosity resistance estimation circuit configured to estimate a viscosity resistance characteristic of a working oil on a basis of the revolution state of the electric motor;

a basic controlled variable calculating circuit configured to calculate a basic controlled variable of the electric motor on the basis of a torque signal from the torque sensor;

a correction circuit configured to correct the basic controlled variable on the basis of a viscosity resistance characteristic indicative signal from the viscosity resistance estimation circuit and based on an actual number of revolutions per unit time of the motor; and an electric motor control circuit configured to output the basic controlled variable corrected by means of the correction circuit as an electric motor control signal to the electric motor.

* * * * *